United States Patent
Tucker et al.

(10) Patent No.: US 10,055,369 B1
(45) Date of Patent: Aug. 21, 2018

(54) SYSTEMS AND METHODS FOR COALESCING INTERRUPTS

(71) Applicant: Apple Inc., Cupertino, CA (US)

(72) Inventors: Charles E. Tucker, Campbell, CA (US); Erik P. Machnicki, Los Altos, CA (US); Fan Wu, Milpitas, CA (US); John H. Kelm, Belmont, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/470,643

(22) Filed: Mar. 27, 2017

(51) Int. Cl.
| | |
|---|---|
| *G06F 13/26* | (2006.01) |
| *G06F 13/34* | (2006.01) |
| *H04L 12/46* | (2006.01) |
| *G06F 9/48* | (2006.01) |
| *H04L 12/801* | (2013.01) |
| *G06F 9/50* | (2006.01) |

(52) U.S. Cl.
CPC ............ *G06F 13/26* (2013.01); *G06F 9/4825* (2013.01); *G06F 9/4843* (2013.01); *G06F 9/5038* (2013.01); *G06F 13/34* (2013.01); *H04L 12/46* (2013.01); *H04L 47/29* (2013.01)

(58) Field of Classification Search
CPC ...................................................... G06F 9/5038
See application file for complete search history.

(56) References Cited

U.S. PATENT DOCUMENTS

| | | | |
|---|---|---|---|
| 7,093,141 B2 | 8/2006 | Elnozahy et al. | |
| 7,716,506 B1* | 5/2010 | Surgutchik | G06F 1/3203 713/321 |
| 7,788,434 B2 | 8/2010 | Pesavento et al. | |
| 9,535,483 B2 | 1/2017 | Min et al. | |
| 9,547,546 B2 | 1/2017 | Baumeister et al. | |
| 2012/0210032 A1* | 8/2012 | Wang | G06F 13/24 710/260 |

* cited by examiner

*Primary Examiner* — Farley J Abad
(74) *Attorney, Agent, or Firm* — Rory D. Rankin; Meyertons, Hood, Kivlin, Kowert & Goetzel, P.C.

(57) ABSTRACT

Systems, apparatuses, and methods for coalescing interrupts temporally for later processing are described. An interrupt controller in a computing system maintains a timer for tracking an amount of time remaining after receiving an interrupt before a processor is awakened to service the interrupt. For a received interrupt with a latency tolerance greater than a threshold, the interrupt controller compares a value currently stored in the timer and the latency tolerance selected based on class. The smaller value is retained in the timer. When the timer expires, the interrupt controller sends wakeup indications to one or more processors and indications of the waiting interrupts.

20 Claims, 5 Drawing Sheets

SYSTEMS AND METHODS FOR COALESCING INTERRUPTS

BACKGROUND

Technical Field

Embodiments described herein relate to the field of processors and more particularly, to coalescing interrupts temporally for later processing.

Description of the Related Art

A computing system such as a semiconductor chip includes multiple functional blocks or units, each capable of processing data. In various embodiments, the multiple functional units are individual dies on one of a system on a chip (SOC), a multi-chip module (MCM) or a printed circuit board. The computing system also includes multiple sources of interrupts. The multiple sources include external peripheral devices and the internal functional units. An interrupt controller receives interrupts generated by the sources.

One or both of the source and the interrupt controller determines a corresponding priority level for an interrupt generated by the source. In addition, the interrupt controller identifies a given one of the functional units in the computing system for handling the interrupt. For example, a graphics processor may be identified for processing video data associated with a given interrupt. Alternatively, a general-purpose processor or another single-instruction-multiple-data (SIMD) processor may be identified for processing audio data associated with a given interrupt.

At a later time, the interrupt controller sends the received interrupt request to the identified processor. The processor may be in a low-power mode, such as an idle power-performance state (P-state). This idle state is also referred to as a sleep state. An appreciable amount of time may elapse for the processor to transition to an active P-state and provide control to an interrupt service routine (ISR) for handling the interrupt request. After the interrupt is serviced, the processor returns to the sleep state as no other processing is directed to the processor. However, once in the sleep state, another interrupt request is sent from the interrupt controller to the processor causing the processor to transition again from the sleep state to the active state.

An appreciable amount of power is consumed to repeatedly wake up the processor. In addition, when there is no other processing directed to the processor other than handling the received interrupt request, the processor is inefficiently used as well as consuming a significant amount of power.

SUMMARY

Systems and methods for coalescing interrupts temporally for later processing are contemplated. In various embodiments, a computing system, such as a semiconductor chip, includes an interrupt controller with an interface to multiple sources of interrupts. The sources include a variety of external peripheral devices and functional units within the semiconductor chip. In some embodiments, the interrupt controller maintains a timer to track an amount of time remaining after receiving an interrupt before a processor is awakened to service the interrupt.

In response to receiving an interrupt and determining a processor identified to service the interrupt is in an idle or sleep state, the interrupt controller determines a latency tolerance for the interrupt. In various embodiments, the interrupt controller tracks the latencies of a finite number of classes of interrupts. In some embodiments, the computing system supports hundreds of interrupt types. Rather than support a latency tolerant interrupt class for each individual type of the hundreds of interrupt types, designers define a finite number of classes to provide a coarser granularity. For example, multiple interrupt types share a similar latency tolerance and are grouped together in a same class.

One class of the multiple classes of latency tolerances is reserved for interrupt types indicating possible system failure. These interrupt types indicate conditions such as a thermal overflow, a power off warning and so on. For interrupt types in this class, a negligible amount of waiting occurs before sending these interrupts from the interrupt controller to an identified processor for servicing. In some embodiments, the latency tolerance is set at zero. For interrupts in other classes of latency tolerances, the interrupt controller compares a value currently stored in the timer and the latency tolerance selected based on class. If the latency tolerance selected based on class is less than the current value stored in the timer, the value in the timer is replaced with the latency tolerance selected based on class. Therefore, the smaller value is chosen when a new interrupt is received.

In some embodiments, the timer expires when the updated value reaches zero as the timer decrements. In other embodiments, the timer expires when the updated value reaches a set value, such as one of the latency tolerances of a class, as the timer increments. When the timer expires, the interrupt controller sends an indication to wake up to processors in an idle or sleep state followed by sending indications of the interrupts to the processors. Therefore, the processors transition from a sleep state to a wake state based on interrupt servicing at a lower frequency as the interrupts are coalesced temporally. The less frequent transitions reduces power consumption.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
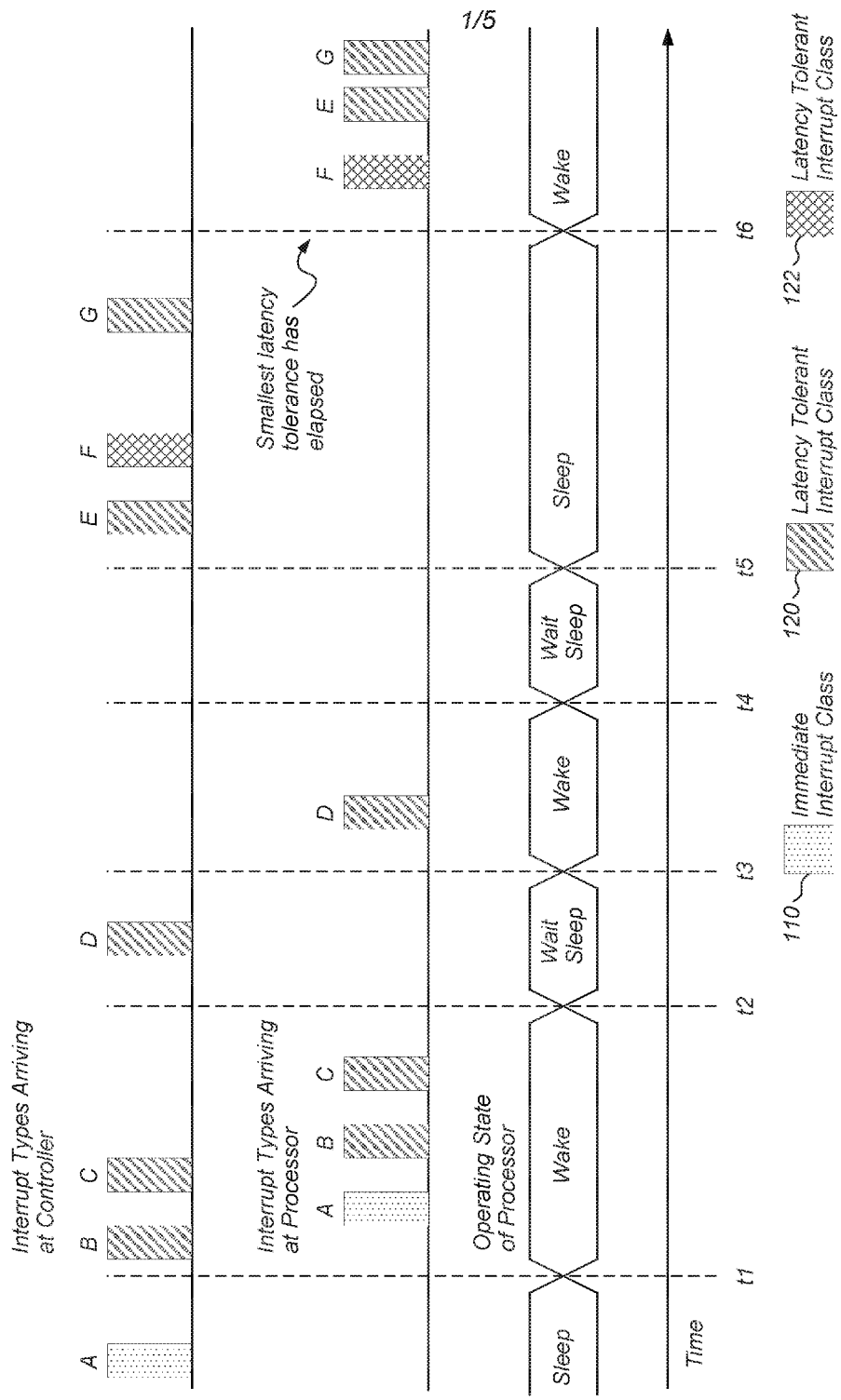
FIG. 1 is a block diagram of one embodiment of a timing diagram of latency tolerant interrupts being serviced.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a generalized block diagram of one embodiment of a timing diagram of latency tolerant interrupts being serviced is shown. A timeline is shown along with the changing operating state of a processor. In some embodiments, the processor is a graphics processor identified for processing video data associated with a given interrupt. The graphics processor may also be identified for processing other highly parallel data applications, such as single instruction multiple data (SIMD) applications, associated with other interrupts. In other embodiments, the processor is a general-purpose processor identified for processing audio data associated with the given interrupt in addition to being identified for processing other relatively low parallel data applications.

Three classes of interrupts are shown in the example. The processor services interrupts of both an immediate interrupt class 110 and two types of latency tolerant interrupt classes 120 and 122. In various embodiments, the immediate interrupt class 110 is reserved for interrupt types indicating possible system failure. Interrupts within the immediate interrupt class 110 may indicate conditions such as a thermal overflow, a power off warning, and so on. For interrupts within the immediate interrupt class 110, a negligible amount of waiting occurs before sending these interrupts from an interrupt controller to the processor for servicing.

The latency tolerance is defined by designers as a tolerable amount of time between a point in time an interrupt is received at the interrupt controller and a point in time the interrupt is sent from the interrupt controller to a processor for servicing. In various embodiments, the latency tolerance is a programmable value. In some embodiments, for interrupts within the immediate interrupt class 110, the latency tolerance is set at zero. In other embodiments, the latency tolerance is set below a relatively low threshold. Each of the latency tolerance and the threshold may be programmable and stored in a configuration and status register visible by software.

The latency tolerant interrupt classes 120 and 122 may be used for interrupt types indicating relatively less severe conditions capable of waiting for service. The amount of time for waiting for service is greater than the threshold and it is set by designers. Although two latency tolerant interrupt classes 120 and 122 are shown, in other embodiments, any number of latency tolerant interrupt classes may be used. The computing system may support hundreds of interrupt types. Rather than support a latency tolerant interrupt class for each individual type of the hundreds of interrupt types, designers may define a finite number of classes to provide a coarser granularity. For example, multiple interrupt types may share a similar latency tolerance and be grouped together in a same class. A latency tolerance for an interrupt received at the interrupt controller is identified based on the selected class. Here, two latency tolerant interrupt classes 120 and 122 are shown for ease of illustration.

As shown, the processor operates in one of multiple operating states at a given time. Here, the operating states wake, "wait sleep," and sleep are shown. Other active states may be used based on power-performance states (P-states) which are selected by a power manager. However, these three states are used in the example for ease of illustration. The wake state of the processor corresponds to an active state and the processor is capable of receiving interrupts and beginning the servicing of the received interrupts. The sleep state corresponds to a power gated or clock gated state. In this state, the processor needs to receive a wakeup indication to transition from the sleep state to the wake state before receiving and handling interrupts.

The "wait sleep" state corresponds to a state when the processor is transitioning from the wake state to the sleep state, but the processor is still able to receive interrupts and begin handling the interrupts should they be received. The processor returns to the wake state, but the processor is able to reach the wake state in far less time than transitioning from the sleep state to the wake state. In various embodiments, the length of time for the "wait sleep" state is based on the processor type. In other embodiments, the length of time for the "wait sleep" state is also programmable.

In the example shown, the processor begins in the sleep state. An interrupt "A" corresponding to the immediate interrupt class 110 is received at the interrupt controller. As a result of receiving the interrupt "A", an indication to awaken is sent from the interrupt controller to the processor. At time t1, the processor transitions from the sleep state to the wake state. The interrupt controller also sends an indication of the interrupt "A" to the processor. Once in the wake state, the processor services the interrupt "A" such as by calling an interrupt service routine (ISR) to handle the interrupt "A."

Additionally, after time t1, the interrupt controller receives the interrupts "B" and "C" corresponding to the latency tolerant interrupt class 120 and while the processor is in the wake state. Therefore, the interrupt controller sends indications of the interrupts "B" and "C" to the processor which services them. Afterward, at time t2, as no further processing is directed to the processor, the processor begins transitioning from the wake state to the sleep state by going through one or more "wait sleep" states.

After time t2, the interrupt controller receives the interrupt "D" corresponding to the latency tolerant interrupt class 120 and while the processor is in the "wait sleep" state. As the processor is not yet in the sleep state, the interrupt controller sends an indication of the interrupt "D" to the processor. In response, the processor returns to the wake state at time t3. Once in the wake state after time t3, the processor services the interrupt "D." Afterward, at time t4, as no further processing is directed to the processor, the processor again begins transitioning from the wake state to the sleep state by going through one or more "wait sleep" states. At time t5, the processor reaches the sleep state.

After time t5, the interrupt controller receives the interrupts "E," "F" and "G" while the processor is in the sleep state. The interrupts "E" and "G" correspond to the latency tolerant interrupt class 120 and the interrupt "F" corresponds to the latency tolerant interrupt class 122. As none of the interrupts "E," "F" and "G" correspond to the immediate interrupt class 110, the interrupt controller does not send a wakeup indication to the processor. Rather, the interrupt controller temporally coalesces the interrupts "E," "F" and "G." In this example, the latency for the latency tolerant interrupt class 122 is less than the latency for the latency tolerant interrupt class 120. For example, the latency for class 122 may be 200 microseconds, whereas the latency for class 120 is 500 microseconds.

The interrupt controller maintains a timer to track an amount of time remaining after receiving an interrupt before a processor is awakened to service the interrupt. When the interrupt "E" is received, as no other interrupts have been received, the timer is initialized to the latency of the class 120. In various embodiments, the timer is updated each clock cycle. In some embodiments, the latency of the class 120, which is 500 microseconds in this example, is converted to a number of clock cycles based on the current operating frequency of the interrupt controller.

When the interrupt "F" is received, the interrupt controller determines the interrupt "F" corresponds to the class 122 which has a latency of 200 microseconds in this example. The latency of class 122 is compared to the current value stored in the timer. For example, 100 microseconds may have passed between the interrupt controller receiving interrupt "E" and interrupt "F." Therefore, if the timer is decrementing, the timer stores a value indicating 400 microseconds remain. The latency of class 122 is smaller, and accordingly, the value in the timer is replaced with the latency of class 122.

When the interrupt "G" is received, the interrupt controller determines the interrupt "G" corresponds to the class 120 which has a latency of 500 microseconds in this example. The latency of class 120 is compared to the current value stored in the timer. For example, 120 microseconds may have passed between the interrupt controller receiving interrupt "F" and interrupt "G." Therefore, if the timer is decrementing, the timer stores a value indicating 80 microseconds remain. The value stored in the timer is smaller, and accordingly, the value in the timer is retained with its current value.

At time t6, the timer expires. The timer expires when the updated value reaches zero as the timer decrements. In other embodiments, the timer expires when the updated value reaches a set value, such as one of the latency tolerances of a class, as the timer increments. When the timer expires, the interrupt controller sends an indication to wake the processor. Therefore, the processor transitions from the sleep state to the wake state. Following, the processor services the interrupts "E," "F" and "G" after receiving indications of the interrupts from the interrupt controller.

In the example shown, the interrupts "E," "F" and "G" are serviced out of the order received at the interrupt controller. Prior to waking up the processor for servicing interrupts, the interrupts "E," "F" and "G" were temporally coalesced by the interrupt controller. At the time of servicing, the interrupts "E," "F" and "G" are coalesced based on one or more of a priority level and the temporal trait such as the class latency. The less frequent transitions from sleep state to wake state for the processor reduces power consumption.

Figure 2:
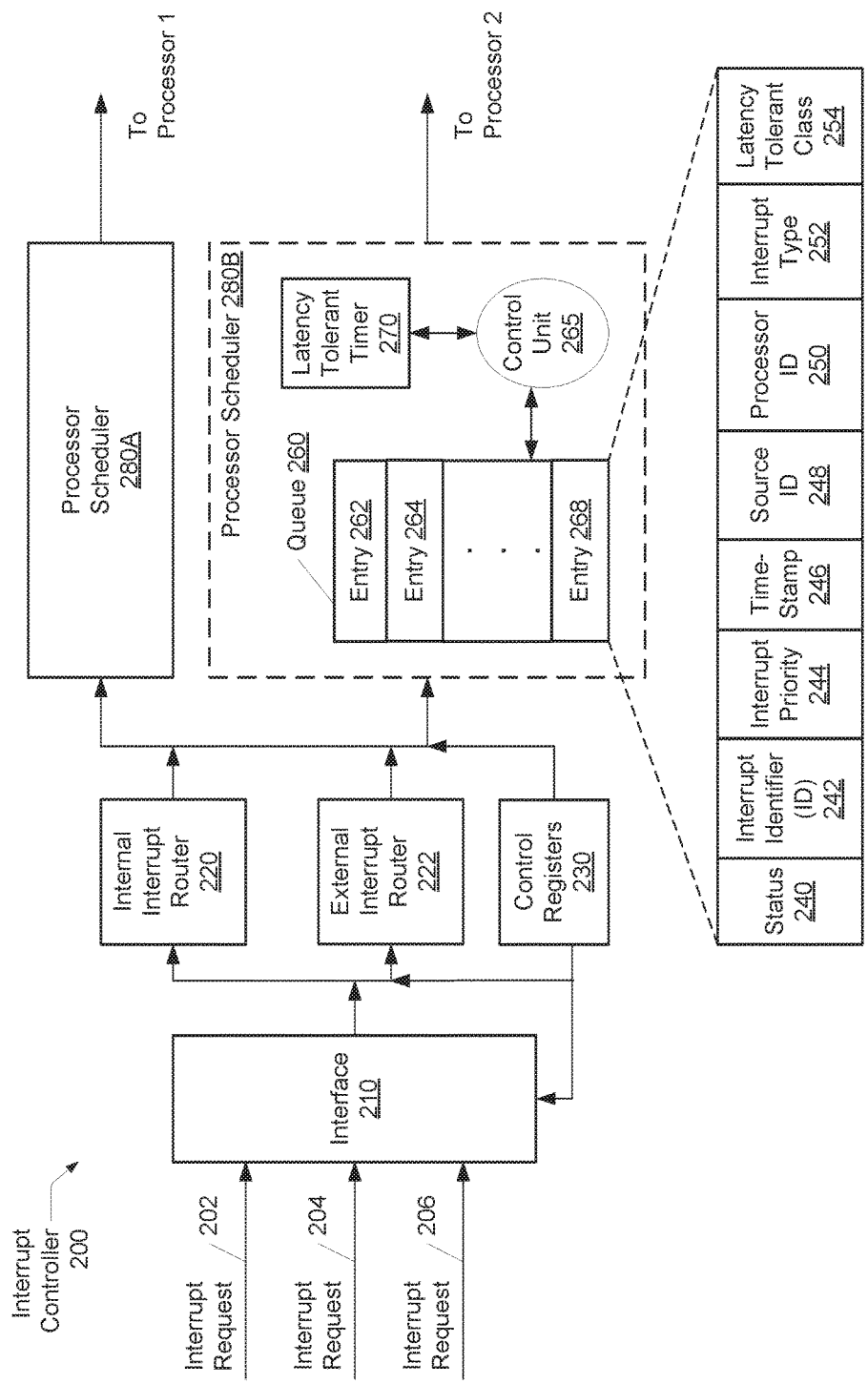
FIG. 2 is a block diagram of one embodiment of an interrupt controller.

Referring now to FIG. 2, a generalized block diagram of one embodiment of an interrupt controller 200 is shown. As shown, the interrupt controller 200 includes interface 210, an internal interrupt router 220, an external interrupt router 222, control registers 230, and processor schedulers 240A-240B. The interface 210 receives interrupt requests 202, 204 and 206 from multiple sources. Although only three interrupt requests are shown, any number of interrupt requests may be conveyed to the interrupt controller 200 concurrently.

Examples of the sources of the interrupt requests 202-206 are the processors generating internal interrupt requests in addition to any number and type of components generating external interrupt requests. These components are coupled to the interrupt controller 200 through a communication bus or a communication fabric. Examples of the components are a display controller, a flash memory controller, a camera subsystem, microphones and speakers, and a variety of other peripheral devices and functional units. The interface 210 uses control logic for handling communication protocols with the multiple sources and synchronizing different operational clock frequencies in addition to queues for storing the incoming interrupt requests 202-206 until the interrupt requests 202-206 are serviced.

The control logic within the interface 210 also includes vector tables for masking the received interrupt requests 202-206. In some embodiments, the control logic within the interface 210 also assigns a priority level to the received interrupt requests 202-206. In one embodiment, the control logic uses a received priority level from the source of the interrupt request. In another embodiment, the control logic combines a received priority level with a generated priority level in the interface 210 to provide a priority level.

In some embodiments, when assigning priority levels, the control logic in the interface 210 uses values stored in one or more of the control registers 230. In various embodiments, the control registers 230 are used as control and status registers for storing configuration values used by the interface 210. In some embodiments, the control registers 230 are updated with software such as firmware, the operating system or a software application. A variety of types of information are stored in the control registers 230 such as mask values for particular interrupt events, relational priority level values among the interrupt events, values used for supporting both edge-level and edge-triggered interrupts, values used for setting a number of latency tolerant classes and the latencies associated with those classes, and so on.

In one embodiment, the internal interrupt router 220 receives interrupt requests of the requests 202-206 which have local processors as sources. Local processors are processors in a same processor complex, on a same SOC or in a same package. Designers are able to define the division between internal and external based on design requirements. The internal interrupt requests are divided into "self" internal interrupts and "normal" interrupt requests. The self-internal interrupts are interrupt requests generated by a local processor which is to be handled by the same local processor. The normal interrupt requests are interrupt requests generated by a local processor which is to be handled by a different local processor. In some embodiments, the internal interrupt router 220 uses fixed mappings between the internal requests and the processors selected to service the requests.

In one embodiment, the external interrupt router 222 receives interrupt requests of the requests 202-206 which have external sources. As described earlier, examples of the external sources are a display controller, a flash memory controller, and a variety of other peripheral devices and functional units not located in a same processor complex, on a same SOC or in a same package. Again, designers are able to define the division between internal and external based on design requirements. The external interrupt router 222 determines which processor should receive a particular one of the external interrupts for servicing based on the type of processing to be done to service the particular interrupt request. For example, external interrupt router 222 determines an interrupt request directed at graphics rendering is to be conveyed to a graphics processing unit (GPU), whereas a general-purpose processor is identified for processing audio data associated with another interrupt request.

Each of the processor schedulers 280A-280B schedule received interrupt requests for a particular target processor in a manner to achieve load balancing and relatively low power consumption. As shown, each of the processor schedulers 280A-280B use a queue 260 for storing the received interrupt requests, a control unit 265 and a latency tolerant timer 270. The latency tolerant timer 270 is separate from any time base timers. The latency tolerant timer 270 maintains a remaining latency between receiving an interrupt request and prior to a target processor is awakened to service the interrupt request. Rather than send a wakeup indication to a target processor in a sleep state when interrupt requests are received, the control unit 265 temporally coalesces interrupt requests.

A received interrupt request is stored in one of the entries 262-268 of the queue 260. Each one of the entries 262-268 is capable of storing the multiple fields 240-254. Although the fields 240-254 are shown in a particular order, any order may be used for storing the information corresponding to the fields 240-254. Additionally, in some embodiments, the information is not stored in contiguous locations.

A status field 240 is used to store valid information and a state of the processing of the interrupt request such as whether an indication has been sent to a target processor and whether the target processor has serviced the interrupt. The identifier (ID) field 242 stores an interrupt type ID or a specific ID defining the interrupt. The interrupt priority is stored in field 244.

The field 246 in the queue 260 stores an associated timestamp for the interrupt. In one embodiment, the timestamp is a value copied from a main time base counter for the system at the time the interrupt request was received or shortly after its processing within the interrupt controller 200. The source ID stored in the field 248 identifies the source of the received interrupt. The processor ID stored in the field 250 identifies the processor selected to service the interrupt.

The field 252 stores an interrupt type such as the earlier self-internal, normal internal and external interrupt types. The field 254 stores an identifier of a latency tolerant class. The control unit 265 tracks the latency tolerances of a finite number of classes of interrupts when the target processor is in a sleep state and temporally coalesces the interrupts based on the finite number of classes. As described earlier, the computing system supports hundreds of interrupt types. Rather than support a latency tolerant for each of the hundreds of interrupt types, designers define a finite number of classes to provide a coarser granularity. For example, multiple interrupt types share a similar latency tolerant and are grouped together in a same class. In some embodiments, the number of classes and the latency tolerant for each of the classes is stored in the control registers 230.

One class of the multiple classes of latency tolerances is reserved for interrupt types indicating possible system failure. The latency tolerant for this class is set at a negligible amount of time for waiting before sending these interrupts to the target processor for servicing. In some embodiments, the latency tolerant is set at zero. The control unit 265 selects one or more entries of the entries 252-258 storing interrupt requests of this class. Information stored in one or more of the fields 240-254 is sent to the target processor identified in the field 250. In some cases, a packet is sent with the information across a link or switch fabric to the identified target processor.

For each interrupt in other latency tolerant classes indicating relatively less severe conditions capable of waiting for service, the control unit 265 compares a value currently stored in the latency tolerant timer 270 and the latency tolerant selected based on the class identified in field 254. In some embodiments, the latency tolerant is stored in field 254 rather than a class ID. If the latency tolerance is less than the current value stored in the timer 270, then the value in the timer 270 is replaced with the latency tolerant selected based on class. Therefore, the smaller value is chosen to be stored in the latency tolerant timer 270 when a new interrupt is allocated in the queue 260 and the target processor is in a sleep state. In some embodiments, when multiple interrupts are allocated in the queue 260 concurrently, the latency tolerances of the interrupts are compared first to find the smallest latency tolerant of the multiple interrupts. Afterward, this smallest latency tolerant is compared to the value currently stored in the timer 270.

In some embodiments, the latency tolerant timer expires when the updated value reaches zero as the timer 270 decrements. In other embodiments, the timer 270 expires when the updated value reaches a set value, such as one of the latency tolerant of a class, as the timer 270 increments. When the timer expires, the control unit 265 sends an indication to wake up the target processor in a sleep state followed by sending information in one or more of the fields 240-254 for each interrupt to the target processor. Therefore, the target processor transitions from a sleep state to a wake state based on interrupt servicing at a lower frequency as the interrupts are coalesced temporally. The order used by the control unit 265 to send the interrupts is based on one or more of priority levels, the latency tolerant class, an age, and so on.

In various embodiments, when the target processor receives the interrupts, the target processor calls an interrupt service routine (ISR) associated with the particular interrupt. When the associated ISR and/or device driver has completed servicing the interrupt, an indication of completion is sent to the control unit 265. In response, the control unit 265 deallocates an associated entry of the entries 240-254, such as updating the status information to indicate the interrupt request is no longer in service.

Figure 3:
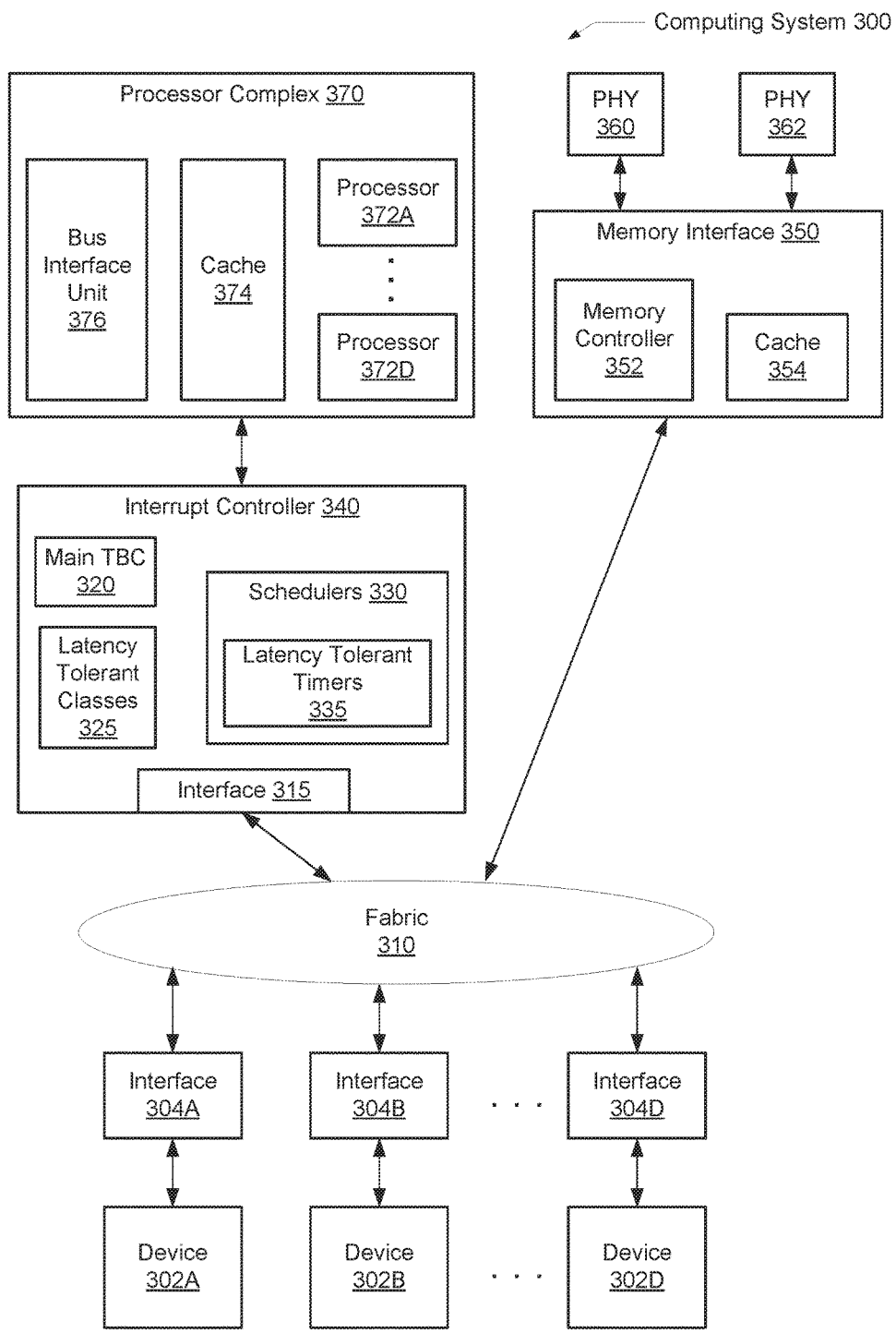
FIG. 3 is a block diagram of one embodiment of a computing system.

Turning now to FIG. 3, a generalized block diagram of one embodiment of a computing system 300 capable of handling interrupts with non-zero latency tolerances is shown. As shown, a communication fabric 310 routes traffic between the devices 302A-302D and each of the memory interface 350 and the processor complex 370. The devices 302A-302D and the processors 372A-372D within the processor complex 370 are capable of generating interrupts, which are received by the interrupt controller 340.

In various embodiments, the computing system 300 is a system on a chip (SOC) that includes multiple types of integrated circuits on a single semiconductor die, each integrated circuit providing a separate functionality. In other embodiments, the multiple functional units are individual dies within a package, such as a multi-chip module (MCM). In yet other embodiments, the multiple functional units are individual dies or chips on a printed circuit board. Clock sources, such as phase lock loops (PLLs), various input/output (I/O) interfaces, and a centralized control block for at least power management are not shown for ease of illustration.

One or more of the number of the devices 302A-302D are on-chip devices. In addition, one or more of the devices 302A-302D are on-chip functional units. Alternatively, one or more of the devices 302A-302D are any variety of computer peripheral devices or other off-chip devices. Examples of the devices 302A-302D are audio, video, camera, and telephony controllers as well as various analog, digital, mixed-signal and radio-frequency (RF) functional units, and so on.

As shown, each of the devices 302A-302D uses a corresponding one of the fabric interfaces 304A-304D for transferring communication traffic. The corresponding fabric interfaces 304A-304D support a variety of communication protocols such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a digital-to-analog converter (DAC), and so forth. Other I/O devices may also include networking peripherals such as media access controllers (MACs) in the respective fabric interface.

One or more of the fabric interfaces 304A-304D may include queues for storing requests and corresponding response data. Additionally, one or more of the fabric interfaces 304A-304D may convert requests and responses as they go back and forth over different types of communication protocols. In some embodiments, the fabric interfaces 304A-304D determine an order between the read and write transactions of a corresponding one of the devices 302A-302D.

In various embodiments, different types of traffic flows independently through the fabric 310. The independent flow is accomplished by allowing a single physical fabric bus to include a number of overlaying virtual channels, or dedicated source and destination buffers, each carrying a different type of traffic. Each channel is independently flow controlled with no dependence between transactions in different channels.

The memory interface 350 uses at least one memory controller 352 and at least one cache 354 for the off-chip memory, such as synchronous DRAM (SDRAM). The memory interface 350 stores memory requests in request queues, uses any number of memory ports, and uses circuitry configured to interface to memory using one or more of a variety of protocols used to interface with memory channels. The memory physical interface circuits (PHYs) 162 and 164 are representative of any number of memory PHYs capable of being coupled to the memory interface 350. Memory PHYs 162 and 164 are used to interface to memory devices (not shown). Memory PHYs 162 and 164 handle the low-level physical interface to the memory devices. For example, the memory PHYs 162 and 164 may be responsible for the timing of the signals, for proper clocking to synchronous DRAM memory, etc.

Processor complex 370 uses a bus interface unit (BIU) 376 for providing memory access requests and responses to at least the processors 372A-372D. Processor complex 370 also supports a cache memory subsystem which includes at least cache 374. In some embodiments, the cache 552 is a shared off-die level two (L2) cache for the processors 372A-372D. Processor complex 370 also uses an interface (not shown) for communication with the fabric 310.

In some embodiments, the processors 372A-372D use a homogeneous architecture. For example, each of the processors 372A-372D is a general-purpose processor, such as central processing unit (CPU), which utilizes circuitry for executing instructions according to a predefined general-purpose instruction set. For example, the ARM®, x86®, x86-64®, Alpha®, MIPS®, PA-RISC®, SPARC® or any other instruction set architecture may be selected. In some embodiments, each core within a CPU supports the out-of-order execution of one or more threads of a software process and include a multi-stage pipeline.

In other embodiments, the processors 372A-372D use a heterogeneous architecture. In such embodiments, one or more of the processors 372A-372D is a highly parallel data architected processor, rather than a CPU. In some embodiments, these other processors of the processors 372A-372D use single instruction multiple data (SIMD) cores. Examples of SIMD cores are graphics processing units (GPUs), digital signal processing (DSP) cores, or otherwise.

In various embodiments, each one of the processors 372A-372D uses one or more cores and one or more levels of a cache memory subsystem. The processors 372A-372D use multiple one nor more on-die levels (L1, L2, L3 and so forth) of caches for accessing data and instructions. If a requested block is not found in the on-die caches or in the off-die cache 374, then a read request for the missing block is generated and transmitted to the memory interface 350 or to on-die flash memory (not shown) controlled by a flash controller.

The interrupt controller 340 receives and routes interrupts from the multiple components within and connected to the computing system 300. For example, any one of the processors 372A-372D and the devices 302A-302D are capable of asserting an interrupt and sending it to the interrupt controller 340. In various embodiments, the interrupt controller 340 uses circuitry in the fabric to ensure coherence among the different processors 372A-372D and the devices 302A-302D. In some embodiments, this circuitry uses cache coherency logic employing a cache coherency protocol to ensure data accessed by each source is kept up to date. An example of a cache coherency protocol includes the MOESI protocol with the Modified (M), Owned (O), Exclusive (E), Shared (S), and Invalid (I) states.

The interrupt controller 340 uses a main time base counter 320 for maintaining a global measurement of elapsed time. The counter 320 starts at system reset and does not stopped or reset until the next system reset. The counter 320 determines timestamps for a variety of steps during the processing of interrupts. The interface 315 uses control logic and storage elements for handling communication protocols with the processors 372A-372D and the devices 302A-302D and the fabric 310. The interrupt controller 340 uses control units and queues (not shown) for storing interrupt requests, assigning priority levels, maintaining status information, identifying target processors of the processors 372A-372D, communicating with each of the processor complex 370 and the memory interface 350, and so on as described earlier.

The latency tolerant classes 325 uses control registers and control logic to select a number of classes and maintain latency tolerances for the selected classes. As described earlier, the computing system 300 may support hundreds of interrupt types. Rather than support a latency tolerance for each individual type of the hundreds of interrupt types, designers define a finite number of classes to provide a coarser granularity. For example, multiple interrupt types may share a similar latency tolerance and may be grouped together in a same class. The number of classes and the corresponding latency tolerances are conveyed from the latency tolerant classes 325 to the schedulers 330.

The schedulers 330 track the latency tolerances of the selected number of classes which are assigned to the received interrupt requests when the target processor of the processors 372A-372D is in a sleep state. The schedulers 330 temporally coalesce the interrupts based on the selected number of classes. The schedulers 330 compare the updated latency tolerances of the received interrupt requests to a corresponding timer of the latency tolerant timers 335.

In some embodiments, the latency tolerance is updated each clock cycle, such as being decremented. If the latency tolerance is less than the current value stored in the corresponding one of the timers 380, then the timer value is replaced with the updated latency tolerance of the interrupt request. If updating the latency tolerances is done by incrementing the latency tolerance, and the timer value of the timers 380 also increments, then the timer value is updated when the latency tolerance is greater than the timer value. When the timer expires, the corresponding scheduler of the schedulers 330 sends an indication to wake up the target processor in a sleep state of the processors 372A-372D. Following, the scheduler of the schedulers 330 sends information associated with one or more interrupt requests to the target processor.

Figure 4:
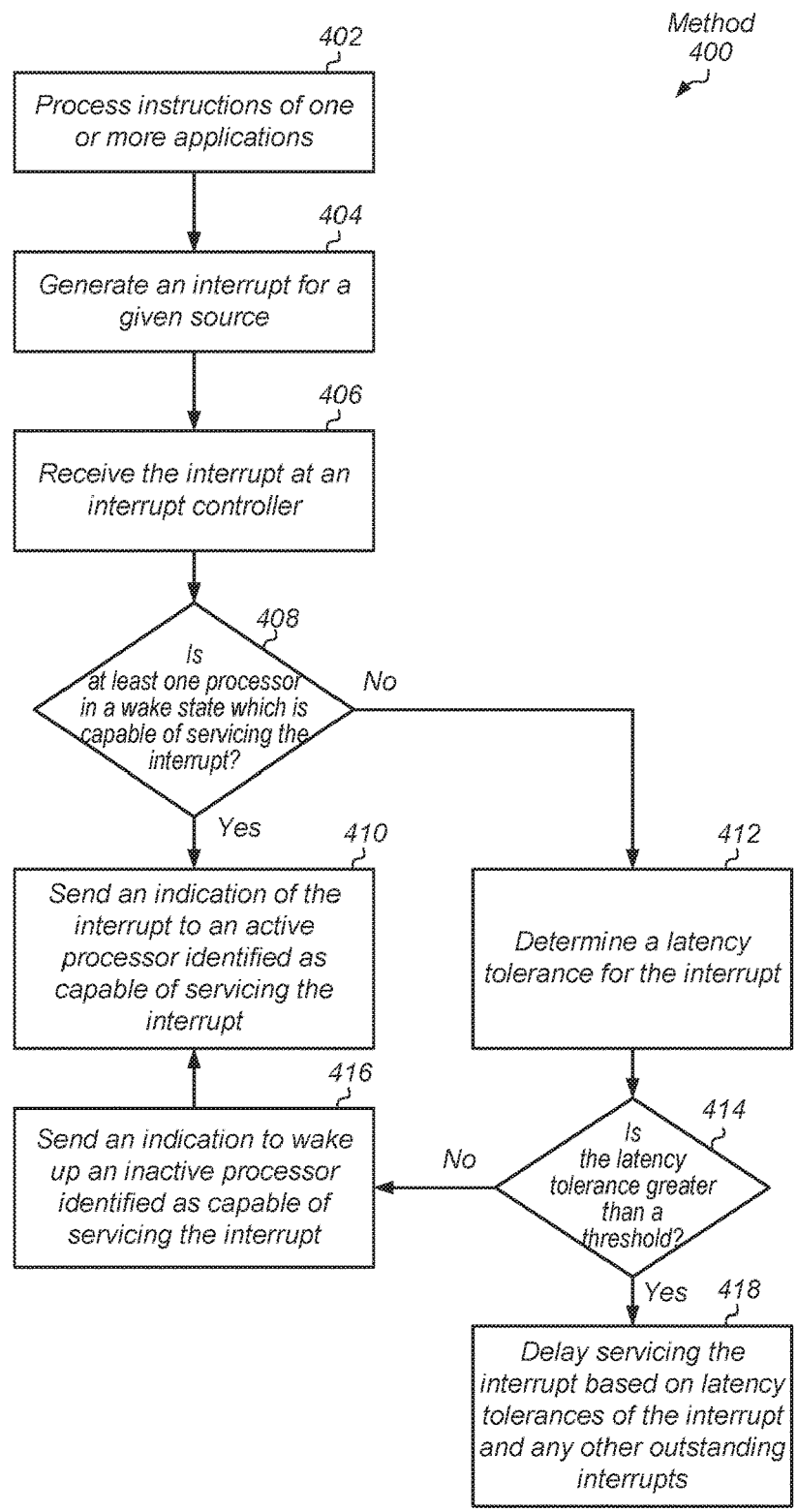
FIG. 4 is a flow diagram of one embodiment of a method for processing a received interrupt with latency tolerance.

Referring now to FIG. 4, a generalized flow diagram of one embodiment of a method 400 for processing a received interrupt with latency tolerance is shown. For purposes of discussion, the steps in this embodiment (as well as in FIG. 5) are shown in sequential order. However, in other embodiments some steps may occur in a different order than shown, some steps may be performed concurrently, some steps may be combined with other steps, and some steps may be absent.

Instructions of one or more software applications are processed by a computing system (block 402). In some embodiments, the computing system is an embedded system such as a system-on-a-chip (SOC). Each of the one or more software applications may be one of a variety of applications available for business applications, medical applications, social media applications, multimedia playback such as movies, song recordings and video games, and so on.

During the processing of applications, a given source determines to assert an interrupt. For example, the source may be a media player or an online communications application with a camera and a microphone. The source may determine video and audio data is to be processed for near future playback. Therefore, the source generates an interrupt (block 404). An asserted signal and/or a packet corresponding to the interrupt request is sent to an interrupt controller within the system. In various embodiments, the generated signal and/or packet is sent through a communication fabric used for transferring traffic, such as both request and response packets, and supporting one or more communication protocols used among the multiple sources.

The interrupt controller receives the generated interrupt (block 406). In some embodiments, a timestamp is recorded, which may be a copy of a current value stored in a main time base counter for the system. Each of the packet and the timestamp may be stored in an entry of a queue for received interrupts. A check is performed to determine whether any processor capable of servicing the received interrupt is in a wake state. Processors capable of servicing the received interrupt are identified as candidate processors. During this check, candidate processors that are in a wake state are considered as well as candidate processors in a retention state which indicates the processor began transitioning from a wake state to a sleep state but is able to relatively quickly return to the wake state. If at least one processor in a wake state which is capable of servicing the interrupt is found ("yes" leg of the conditional block 408), then an indication of the interrupt is sent to an active processor identified as capable of servicing the interrupt (block 410).

If no processor is found in a wake state which is capable of servicing the interrupt ("no" leg of the conditional block 408), then a latency tolerance is determined for the interrupt (block 412). The latency tolerance is defined by designers as a tolerable amount of time between a point in time an interrupt is received and a point in time the interrupt is sent to a processor for servicing. In some embodiments, a latency tolerance for an interrupt type is programmable.

In various embodiments, classes are maintained based on the latency tolerance of interrupts. The computing system may support hundreds of interrupt types. Rather than support a latency tolerance for each individual type of the hundreds of interrupt types, a coarser granularity may be maintained. For example, multiple interrupt types may share a similar latency tolerance. Designers may determine some interrupt types are able to wait for 100 microseconds before being sent for servicing, whereas other interrupt types are able to wait for 400 microseconds, while yet other interrupt types are able to wait a full millisecond before being sent for servicing. In some embodiments, designers define eight classes of interrupts associated with eight separate coarse values for latency tolerances. Although eight classes are being used as an example, another number of classes of interrupts is possible and contemplated.

The latency tolerance may not correspond to a priority level associated with a received interrupt. Although at times the priority level is associated with relatively low latency tolerances, other times this may not be the case. The latency tolerance for a given interrupt type is generally assigned by designers, whereas the priority level for the given interrupt type is assigned by a source generating the interrupt. In various embodiments, the latency tolerance determined for the received interrupt is compared to a threshold. If the latency tolerance is not greater than a threshold ("no" leg of the conditional block 414), then an indication is sent to wake up an inactive processor identified as capable of servicing the interrupt (block 416). Afterward, control flow of method 400 moves to block 410 where an indication of the interrupt is sent to the active processor identified as capable of servicing the interrupt. In some embodiments, each of the indications of waking up the processor and identifying the interrupt are sent at the same time. In other embodiments, these indications are sent in a staggered sequential manner with the wakeup indication preceding the indication indicating the interrupt to service.

In various embodiments, one class of the multiple classes of latency tolerances is reserved for interrupt types indicating possible system failure. These interrupt types indicate conditions such as a thermal overflow, a power off warning and so on. For interrupt types in this class, a negligible amount of waiting occurs before sending these interrupts from the interrupt controller to a corresponding processor for servicing. In some embodiments, the latency tolerance is set at zero. In some embodiments, the threshold used for determining whether an interrupt type qualifies for being in the above severe class is programmable. The threshold may be stored in a configuration and status register visible by software. In other embodiments, the threshold is fixed while the latency tolerances are programmable. In yet other embodiments, both the threshold and the latency tolerances are programmable such as being stored in configuration and status registers visible by software.

The other seven classes may be used for interrupt types indicating far less severe conditions capable of waiting for service. In some embodiments, the range of latencies before being sent for servicing is a hundred microseconds to a full millisecond. However, other ranges are possible and contemplated. The amount of time for waiting for service is set by designers and in many embodiments is programmable as described earlier.

If the latency tolerance of the received interrupt is greater than the threshold ("yes" leg of the conditional block 414), then the servicing of the interrupt is delayed based on latency tolerances of the interrupt and any other outstanding interrupts (block 418). For example, in some embodiments, the latency used prior to sending a wakeup indication to a processor is the current smallest latency of all the outstanding interrupts. Therefore, the latency tolerance of the received interrupt is compared to the current latencies of any other outstanding interrupts. The latencies of the outstanding interrupts have been updated prior to the arrival of the received interrupt. For example, the latencies of the other outstanding interrupts may have been decrementing to a zero value. In other examples, the latencies of the other outstanding interrupts may have been incrementing to a respective maximum value. In some embodiments, the latencies are updated each clock cycle. In other embodiments, another number of clock cycles pass before updating the latencies.

The latency tolerances of the classes may not correspond with priority levels included in received interrupt packets. Although at times the priority level is associated with a relatively low latency tolerance, other times this may not be the case. The latency tolerance for a given interrupt type is assigned by designers, whereas the priority level for the given interrupt type is assigned by a source generating the interrupt.

When the delay has elapsed and servicing of the interrupts begins, in some embodiments, the interrupts are sent to corresponding processors based on priority levels. Therefore, the received interrupts are originally coalesced temporally while no processors capable of servicing the outstanding interrupts are in a wake state. However, at the time of servicing, the interrupts may be coalesced based on the priority levels determined by one or more of the interrupt controller and the source which generated the interrupt.

In other embodiments, at the time of servicing, the interrupts are coalesced based on a combination of the priority level and the temporal trait such as the classes of latency tolerances. It is also noted that if a processor capable of servicing one or more outstanding interrupts is awakened by another means prior to the delay has elapsed, then those interrupts are coalesced for servicing based on one or more of the priority levels and the classes of latency tolerances. If any outstanding interrupts remain, then monitoring of the delay continues although the delay may be updated based on the remaining outstanding interrupts. Otherwise, if no outstanding interrupts remain, then no more monitoring of the delay continues until a new outstanding interrupt is received.

Figure 5:
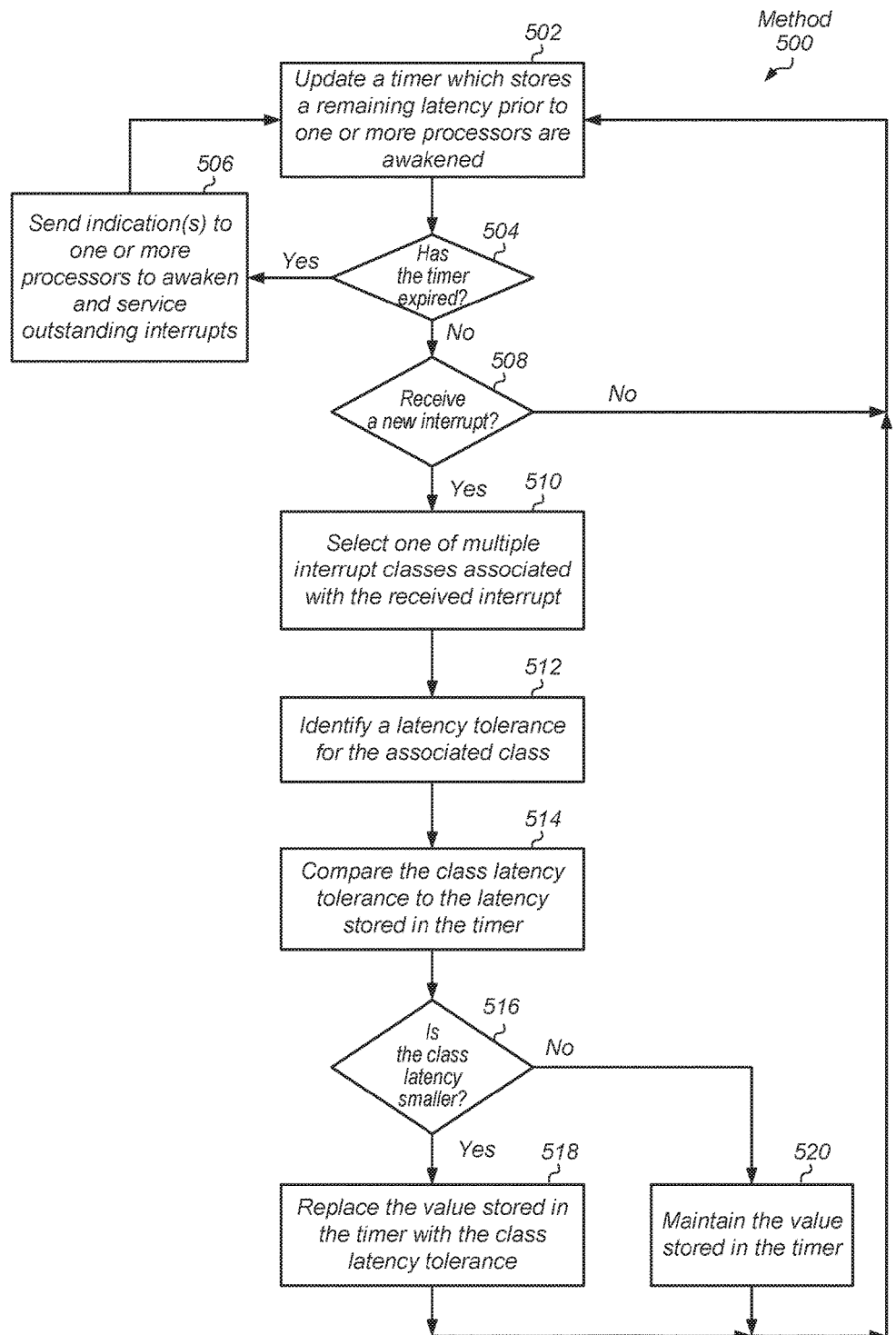
FIG. 5 is a flow diagram of one embodiment of a method for updating a delay prior to servicing interrupts.

Turning now to FIG. 5, a generalized flow diagram of one embodiment of a method 500 for updating a delay prior to servicing interrupts is shown. The steps described correlate with the earlier block 318 where one or more outstanding interrupts are waiting for servicing while processors capable of servicing the interrupts are not in a wake state. A timer, which stores a remaining latency prior to one or more processors are awakened, is updated (block 502). In various embodiments, the timer is loaded with a latency tolerance of an outstanding interrupt and is decrementing to a zero value. In other embodiments, the timer is incrementing from zero to the latency tolerance of the outstanding interrupt. Other start and end values may be selected where the difference is the latency tolerance of the given interrupt. If there are no outstanding interrupts, the timer may be reloaded with a default initial value each clock cycle. In various embodiments, the timer is maintained within an interrupt controller.

If no processors are awakened yet, the timer continues to be updated from its current value. Should one or more processors be awakened for a reason other than the timer has expired, such as the power manager has updated a P-state to an active state, one or more indications of outstanding interrupts are sent to the wakened processors. Afterward, the timer is reset based on the default initial value if no outstanding interrupts remain or based on a latency tolerance of one of the remaining outstanding interrupts.

In some embodiments, the timer is updated each clock cycle. In other embodiments, another number of clock cycles pass before the timer is updated. In various embodiments, a designer selects a value for the latency tolerance of the given interrupt in units of time, such as 200 milliseconds in one example, and the value is converted to a number of clock cycles based on the current operating frequency. Should the operating frequency change when a different power-performance state (P-state) is selected, the number of clock cycles is adjusted accordingly.

If the timer has expired ("yes" leg of the conditional block 504), then one or more indications are sent from the interrupt controller to one or more processors to awaken and service the current outstanding interrupts (block 506). As described earlier, the outstanding interrupts are coalesced for servicing based on one or more of the priority levels and the classes of latency tolerances. Afterward, control flow of method 500 returns to block 502 where the timer is updated. In this case, as all outstanding interrupts are serviced, the timer is reset to indicate no outstanding interrupts are available. In various embodiments, the timer is not set to a new value until a new interrupt is received. Therefore, control flow of method 500 repeats through blocks 502-508 until a new interrupt is received.

If the timer has not yet expired ("no" leg of the conditional block 504), and no new interrupt has been received ("no" leg of the conditional block 508), then control flow of method 500 returns to block 502 where the timer is updated. However, if a new interrupt has been received ("yes" leg of the conditional block 508), then one of multiple interrupt classes associated with the received interrupt is selected (block 510). One or more of the interrupt type and a source identifier may be used to select a class for the new interrupt.

As described earlier, the latency tolerance is defined by designers as a tolerable amount of time between a point in time an interrupt is received at an interrupt controller and a point in time the interrupt is sent from the interrupt controller to a processor for servicing. In some embodiments, a latency tolerance for an interrupt type is a programmable value. The computing system may support hundreds of interrupt types. Rather than support a latency tolerance for each individual type of the hundreds of interrupt types, designers may define a finite number of classes to provide a coarser granularity. For example, multiple interrupt types may share a similar latency tolerance and be grouped together in a same class. A latency tolerance for the new interrupt is identified based on the selected class (block 512).

The class latency of the new interrupt is compared to the latency stored in the timer (block 514). If the class latency tolerance is not smaller than the latency currently stored in the timer ("no" leg of the conditional block 516), then the value stored in the timer is maintained (block 520) and control flow of method 500 returns to block 502 for updating the timer based on its current stored value. However, if the class latency tolerance is smaller than the latency currently stored in the timer ("yes" leg of the conditional block 516), then the value stored in the timer is replaced with the class latency tolerance of the new interrupt (block 518).

After possibly updating the timer based on comparing the timer value and the class latency, the control flow of method 500 returns to block 502 for updating the timer based on the latency tolerance of the new interrupt. Therefore, the latency used prior to sending a wakeup indication to a processor for servicing interrupts is the current smallest latency of all the outstanding interrupts. If multiple interrupts are received at a same time, the smallest latency tolerance of the multiple new interrupts is selected for the comparing step in block 514.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An interrupt controller comprising:
   an interface configured to receive a plurality of asserted interrupts from a plurality of sources;
   a queue comprising a plurality of entries, each entry configured to store an interrupt;
   a timer configured to maintain an amount of time before one or more processors are awakened; and
   control logic configured to:
      in response to receiving an interrupt from one of the plurality of sources and determining each of one or more processors is in a sleep state:
         determine a latency tolerance for the interrupt; and
      in response to determining the latency tolerance is greater than a threshold:
         compare the latency tolerance to a value currently stored in the timer; and
         replace the value stored in the timer with the latency tolerance responsive to determining the latency tolerance is less than the value.

2. The interrupt controller as recited in claim 1, wherein in further response to determining the latency tolerance is greater than the threshold, the control logic is further configured to maintain the value stored in the timer responsive to determining the latency tolerance is greater than the value.

3. The interrupt controller as recited in claim 1, wherein determining the latency tolerance for the interrupt comprises determining a class of a plurality of classes of interrupts is associated with the interrupt, wherein the class has an associated latency tolerance.

4. The interrupt controller as recited in claim 3, wherein the control logic is further configured to maintain a separate latency tolerance for each of the plurality of the classes of interrupts.

5. The interrupt controller as recited in claim 1, wherein the control logic is further configured to send an indication to wake up a first processor of the one or more processors responsive to determining the timer within the interrupt controller has expired.

6. The interrupt controller as recited in claim 5, wherein the control logic is further configured to send indications of the interrupt and other outstanding interrupts to one or more processors for servicing.

7. The interrupt controller as recited in claim 1, wherein in response to determining the latency tolerance is less than the threshold, the control logic is further configured to send an indication of the interrupt and an indication to wake up from the interrupt controller to a first processor of the one or more processors.

8. The interrupt controller as recited in claim 1, wherein in response to determining a first processor of the one or more processors is not in a sleep state, the control logic is further configured to send an indication of the interrupt from the interrupt controller to the first processor.

9. A method comprising:
   asserting an interrupt from a source;
   in response to detecting the interrupt in an interrupt controller and determining each of one or more processors is in a sleep state:
      determining a latency tolerance for the interrupt; and
      in response to determining the latency tolerance is greater than a threshold:
         comparing the latency tolerance to a value currently stored in a timer within the interrupt controller, wherein the timer maintains an amount of time before one or more processors are awakened; and
         replacing the value stored in the timer with the latency tolerance, in response to determining the latency tolerance is less than the value.

10. The method as recited in claim 9, wherein in further response to determining the latency tolerance is greater than the threshold, the method further comprises maintaining the value stored in the timer responsive to determining the latency tolerance is greater than the value.

11. The method as recited in claim 9, wherein determining the latency tolerance for the interrupt comprises determining a class of a plurality of classes of interrupts is associated with the interrupt, wherein the class has an associated latency tolerance.

12. The method as recited in claim 11, further comprising maintaining a separate latency tolerance for each of the plurality of the classes of interrupts.

13. The method as recited in claim 9, further comprising sending an indication to wake up a first processor of the one or more processors responsive to determining the timer within the interrupt controller has expired.

14. The method as recited in claim 13, further comprising sending indications of the interrupt and other outstanding interrupts to one or more processors for servicing.

15. The method as recited in claim 9, wherein in response to determining the latency tolerance is less than the threshold, the method further comprises sending an indication of the interrupt and an indication to wake up to a first processor of the one or more processors.

16. The method as recited in claim 9, wherein in response to determining a first processor of the one or more processors is not in a sleep state, the method further comprises sending an indication of the interrupt from the interrupt controller to the first processor.

17. A non-transitory computer readable storage medium comprising program instructions operable to maintain accurate interrupt timestamps a computing system, wherein the program instructions are executable by a processor to:
   assert an interrupt from a source;
   in response to receiving the interrupt from the source in an interrupt controller and determining each of one or more processors is in a sleep state:
   determine a latency tolerance for the interrupt; and
   in response to determining the latency tolerance is greater than a threshold:
      compare the latency tolerance to a value currently stored in a timer within the interrupt controller, wherein the timer maintains an amount of time before one or more processors are awakened; and
      replace the value stored in the timer with the latency tolerance, responsive to determining the latency tolerance is less than the value.

18. The non-transitory computer readable storage medium as recited in claim 17, wherein in further response to determining the latency tolerance is greater than a threshold, the program instructions are further executable by a processor to maintain the value stored in the timer responsive to determining the latency tolerance is greater than the value.

19. The non-transitory computer readable storage medium as recited in claim 17, wherein determining the latency tolerance for the interrupt comprises determining a class of a plurality of classes of interrupts is associated with the interrupt, wherein the class has an associated latency tolerance.

20. The non-transitory computer readable storage medium as recited in claim 19, wherein the program instructions are further executable by a processor to maintain a separate latency tolerance for each of the plurality of the classes of interrupts.

* * * * *